Feb. 26, 1952 B. H. SHAFFER 2,587,393
GRASS TRIMMER
Filed Jan. 12, 1950

INVENTOR.
BENJAMIN H. SHAFFER
BY
J.S. Murray
ATTORNEY

Patented Feb. 26, 1952

2,587,393

UNITED STATES PATENT OFFICE 2,587,393

GRASS TRIMMER

Benjamin Harrison Shaffer, Dearborn Township, Mich., assignor of one-half to Walter A. Shaffer, Dearborn Township, Mich.

Application January 12, 1950, Serial No. 138,223

3 Claims. (Cl. 56—243)

This invention relates to grass trimmers and particularly trimmers employing a pair of toothed cutting blades, one reciprocating on the other.

An object of the invention is to equip a grass trimmer with an elongated handle; to secure to such handle a plate having forwardly projecting teeth between which grass is held while being cut; to mount on said plate an upper and a lower toothed cutting blade, one reciprocating across the other; and to mount a roller or the like on the plate, as a support for the entire implement.

Another object is to extend the mounting plate teeth forwardly beyond those on said blades to guide grass between the cutting teeth.

Another object is to house mechanism for reciprocating the uppermost cutting blade in a member surmounting such blade, and to adapt such member to transmit a pressure holding the blades in proper working relation, the housing member having portions sprung under said pressure to increase the feasible range of pressure regulation and exert a locking action on a nut which applies the pressure.

These and various other objects are attained by the construction hereinafter described and illustrated in the accompanying drawing, wherein.

Figure 1:
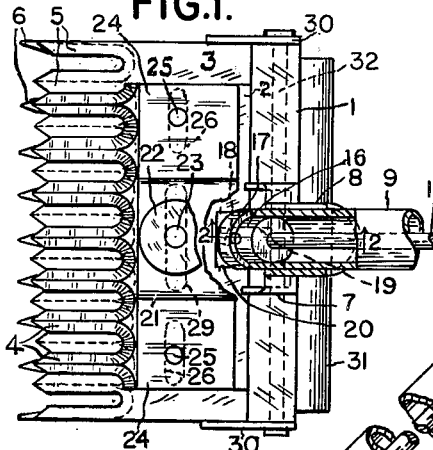
Fig. 1 is a top plan view of my improved trimmer, omitting the major portion of its handle.
Figure 2:
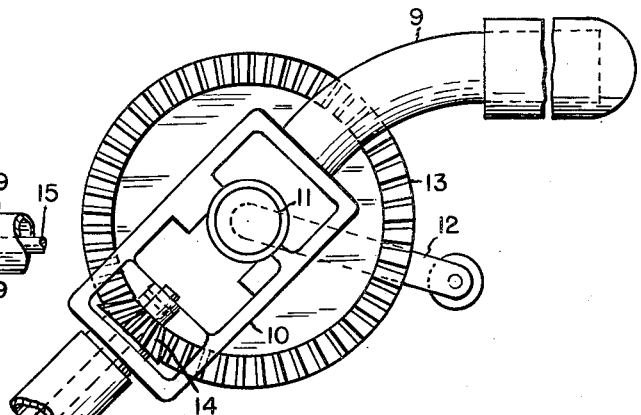
Fig. 2 is a side elevational view of the implement, partly in section on the line 2—2 of Fig. 1.
Figure 2:
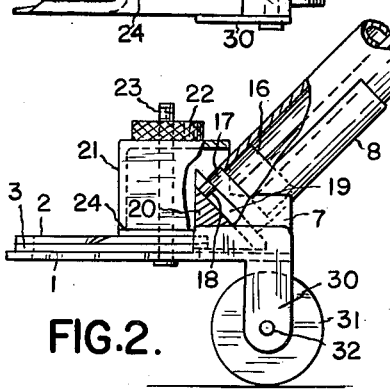

In these views, the reference character 1 designates a rectangular mounting plate, carrying a pair of upper and lower rectangular cutting blades 2 and 3 respectively. As will presently be described the upper blade 2 reciprocates across the lower blade 3 to effect coaction of bevel-edged cutting teeth, designated 4 on the upper blade and 5 on the lower one. Said teeth project forwardly from the blades, and the plate 1 has dull-edged teeth 6 projecting forwardly beyond the teeth 4 and 5 to guide grass between the latter teeth and afford such grass lateral support under cutting stresses. The cutting edges of the blade teeth are preferably parallel and said teeth are somewhat pointed at their front ends, and the guide teeth 6 are more acutely pointed.

Adjoining its rear edge, the plate 1 carries a U-shaped upstanding housing member 7 which is forwardly and upwardly open. Rigidly mounted on this member is a handle seat 8 projecting upwardly at a rearward inclination and substantially semicylindrical. Fitted in and welded to the seat 8 is the lower end of an elongated tubular handle 9, upwardly extending and rearwardly inclined. Rigidly inserted in such handle, in proximity to its grip-forming upper end, is a frame 10, journaling a stub shaft 11 mounting a crank 12 and a bevel gear 13 driven by the crank. Meshed with such gear is a bevel pinion 14 fixed on the upper end of a drive shaft 15 centrally housed in the handle 9, its upper end being journaled in the frame 10. In the lower end of the handle is rigidly inserted another bearing 16 for said shaft, which rigidly carries a crank disk 17 just below the handle. A pin 18 on such disk extends into a groove 19 formed in a drive block 20 welded or otherwise fixed on the upper blade 2. Said groove is elongated in the vertical diametrical plane of the disk 17, whereby the disk reciprocates the blade 2 laterally, when driven.

Figure 3:
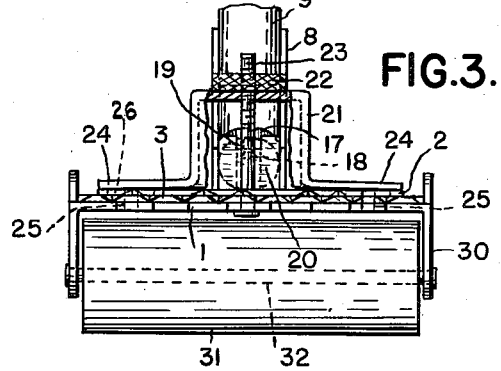
Fig. 3 is a front view of the implement omitting its handle.
Figure 4:
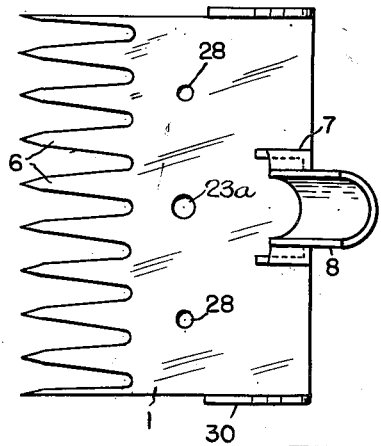
Figs. 4, 5 and 6 are top plan views respectively of the mounting plate for the cutting blades, and of the lower and upper blades.
Figure 5:
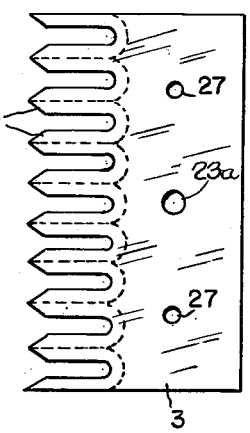
Figure 6:
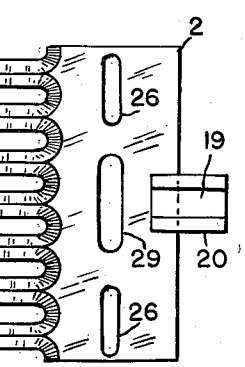
Figure 7:
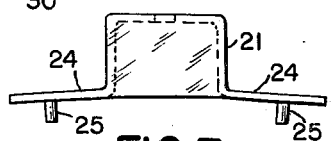
Fig. 7 is a front view of a housing member employed in the construction.

Surmounting the blade 2, rearwardly of its cutting teeth, is a rectangular housing member 21 closed at its top, front, and sides and rearwardly adjoining the housing member 7. The members 7 and 21 jointly enclose the disk 17 and drive block 20, preventing clogging of these parts with grass or dirt. The housing member 21 transmits to the blade 2 a pressure suited to its engagement with the blade 3, such pressure being applied by a nut 22 on the upper end of a bolt 23 headed beneath the plate 1 and securing the blades between such plate and the member 21, the blades each having an aperture 23a to receive said bolt. The member 21 integrally carries a pair of spring lugs 24 projecting oppositely from such member in the direction of reciprocation of the blade 2 and seating said member on such blade. Said lugs tend to a slight relative angularity as best appears in Fig. 3, and the nut 22 may overcome this angularity to a desired extent, affording a suitable selectivity of the pressure set up between the blades. Also this feature subjects the nut to a spring reaction of said pressure, tending to lock the nut from working loose. Swiveling of the blades 2 and 3 or housing member 21 on the bolt 23 is prevented by a pair of pins 25 secured to and downwardly projecting from the lugs 24 and received in slots 26 of the blade 2, perforations 27 of the blade 3, and perforations 28 of the plate 1. The slots 26 of the blade 2 in conjunction with a slot 29 thereof receiving the bolt 23 afford said blade its requisite freedom of reciprocation.

Between a pair of lugs 30 downwardly projecting from the plate 1 at the ends of its rear portion is mounted a roller 31 fixed on a pin 32 journaled in such lugs, such roller supporting the implement in its grass-cutting advance.

Various earlier implements have been patented, seeking a relative actuation of coacting toothed blades, while affording a standing position of an operator. Such implements, however, are not in production and it is believed they have failed to overcome mechanical difficulties of such an implement. Vital features of present improvements are the resilient pressure under which the blades are engaged, affording a considerable regulation of such pressure, and the disclosed mounting of the blades on a plate 1, toothed to feed the grass to the cutting teeth of the blades. The positioning effect of the plate 1 on the grass has been found a material asset in effecting satisfactory functioning of the blades. The disclosed manner of housing the mechanism for reciprocating the blade 2 is also believed to eliminate a material defect of prior constructions, which have lacked a satisfactory safeguard against clogging of such mechanism.

What I claim is:

1. A grass trimmer comprising a mounting plate, a handle, means rigidly securing the handle to such plate, a blade substantially fixed on and surmounting said plate and having forwardly projecting cutting teeth, a companion toothed blade surmounting the fixed blade and laterally reciprocable thereon, mechanism carried at least partially by the handle for reciprocating the reciprocable blade, a housing member surmounting the reciprocable blade for enclosing a portion of said mechanism, a pair of lugs resiliently carried by and oppositely projecting from the housing member and yieldably seating such member on the reciprocable blade, means interconnecting said plate and housing member for applying downward pressure to said member, and means carried by the housing member for guiding the reciprocable blade in its reciprocation.

2. A grass trimmer comprising a mounting plate, a handle, means rigidly securing the handle to such plate, a blade substantially fixed on and surmounting said plate and having forwardly projecting cutting teeth, a companion toothed blade surmounting the fixed blade and laterally reciprocable thereon, mechanism carried at least partially by the handle for reciprocating the reciprocable blade, a housing member surmounting the reciprocable blade for enclosing a portion of said mechanism, a pair of lugs carried by and oppositely projecting from the housing member and downwardly sprung to seat said member on the reciprocable blade and transmit downward pressure to such blade, means interconnecting said plate and housing member for applying such pressure to the housing member, and pins carried by the housing member and extended through the blades and said plate to maintain their working relation, the reciprocable blade being slotted in the direction of its reciprocation to accommodate said pins.

3. A grass trimmer comprising a mounting plate having a row of guide teeth at its front edge, a handle, means rigidly securing the handle to the rear portion of said plate, a blade substantially fixed on and surmounting said plate, a companion blade surmounting and laterally reciprocable on the fixed blade, said blades having their front edges formed with coacting cutting teeth, and said guide teeth projecting forwardly from the mounting plate beyond said cutting teeth to deliver grass between the cutting teeth, mechanism carried at least partially by the handle for reciprocating the reciprocable blade, and means maintaining the reciprocable blade in operative juxtaposition to the fixed blade.

BENJAMIN HARRISON SHAFFER.

REFERENCES CITED

The following references are of record in the file of this patent:

UNITED STATES PATENTS

| Number | Name | Date |
|---|---|---|
| 603,919 | McCallum | May 10, 1898 |
| 736,854 | Long | Aug. 18, 1903 |
| 784,893 | Schick | Mar. 14, 1905 |
| 798,113 | Peterson | Aug. 29, 1905 |
| 816,235 | Johnson | Mar. 27, 1906 |
| 864,266 | Sahlmann et al. | Aug. 27, 1907 |
| 944,712 | Berens | Dec. 28, 1909 |
| 1,027,190 | Ekrem | May 21, 1912 |
| 1,552,940 | Aurele | Sept. 8, 1925 |
| 1,647,867 | Hutsell | Nov. 1, 1927 |
| 1,759,569 | Forsberg | May 20, 1930 |
| 1,850,992 | Burkard | Mar. 29, 1932 |
| 1,913,721 | Pavelko | June 13, 1933 |